United States Patent [19]

Marsilio

[11] Patent Number: 5,098,629
[45] Date of Patent: Mar. 24, 1992

[54] METHOD OF MANUFACTURING BATHTUBS AND THE LIKE USING MOLDING APPARATUS AND RESILIENT INSERT

[75] Inventor: Ronald M. Marsilio, Mogadore, Ohio

[73] Assignee: American Standard Inc., New York, N.Y.

[21] Appl. No.: 523,742

[22] Filed: May 15, 1990

[51] Int. Cl.$^5$ .................. B29C 41/20; B29C 43/18
[52] U.S. Cl. .................. 264/266; 264/259; 264/320; 264/325; 264/338
[58] Field of Search ............. 264/219, 225, 254, 259, 264/313, 316, 338, 266, 320, 325; 425/129.1, DIG. 44

[56] References Cited

U.S. PATENT DOCUMENTS

| | | |
|---|---|---|
| 1,618,165 | 2/1927 | Boschelli . |
| 2,471,008 | 5/1949 | Pretty . |
| 3,029,765 | 4/1962 | Navikas . |
| 4,024,007 | 5/1977 | Jago et al. . |
| 4,562,032 | 12/1985 | Gaudreau ............. 425/DIG. 44 |
| 4,664,982 | 5/1987 | Genovese et al. ............. 428/447 |
| 4,740,324 | 4/1988 | Schur . |
| 4,795,600 | 1/1989 | Kromrey . |
| 4,876,042 | 10/1989 | Imataki et al. . |

Primary Examiner—Hubert C. Lorin
Assistant Examiner—Angela Ortiz
Attorney, Agent, or Firm—Blum Kaplan

[57] ABSTRACT

A method for providing a coating upon a metal small or the like through the use of an injection molding process includes the use of a resilient, molded insert. The shell is positioned within a mold receptor such that a void is defined between the outer surface of the shell and the inner surface of the mold receptor. A hardenable material is injected into this void, thereby coating the outer surface of the shell. In order to prevent distortion or other damage to the shell due to pressure exerted within the mold, a thin, resilient and substantially flat insert is placed upon the inner surface of the shell. A male mold member engages the insert during the molding process, thereby compressing it. The insert may be formed from a solidifiable material introduced in liquid form into a master shell which then receives the male mold member. Once the insert material solidifies, it nearly perfectly fills any voids which may exist between the male mold member and subsequent shells which may be positioned in the molding apparatus.

20 Claims, 4 Drawing Sheets

METHOD OF MANUFACTURING BATHTUBS AND THE LIKE USING MOLDING APPARATUS AND RESILIENT INSERT

BACKGROUND OF INVENTION

1. Field of the Invention

The field of the invention relates to processes for manufacturing molded articles such as bathtubs and the like.

2. Brief Description of the Prior Art

In the development of bathtubs, porcelain-cast iron fixtures have gradually been replaced by lighter and more resilient component structures. One of the difficulties with the porcelain-cast iron and enamelled fixtures has been their susceptibility to impact damage and their extreme weight which makes movement and installation of large fixtures such as bathtubs and whirlpool tubs difficult. The porcelain-cast iron fixtures did have the advantage of having a very solid feel and high weight bearing capability.

Initial attempts by the industry to replace these porcelain-cast iron fixtures proved difficult. Thin stainless steel fixtures were lighter than the porcelain-cast iron fixtures, but did not have the solid feel or structural strength required for large articles such as bathtubs and whirlpool tubs. The early composite structures have a plastic, hollow feel and would tend to deform, crack, chip or delaminate when subjected to impact, thermal shock or the weight of the typical bather. Additionally, their production required the use of a large amount of polymeric material which increased the weight of a tub and increased the cost of manufacture. Furthermore, certain polymeric materials or resins shrink upon curing. This resulted in bowing, warpage and distortion of the tubs.

Reinforced grids have been used to add strength and rigidity to the surfaces of bathtubs. For example, U.S. Pat. No. 2,820,228 describes the reinforcement of a bathtub by a gridwork secured to the bottom of the tub. The gridwork may also extend to the sides of the tub in order to deaden vibrations in the sides of the tub. Although the gridwork adds strength, it also adds weight and requires additional steps in the manufacturing process.

Various methods have been described for creating a cavity in a molded article. For example, U.S. Pat. Nos. 3,610,563, 3,674,394 and 3,368,239 describe methods for forming articles, such as tanks and molded hollow articles. During the molding operation, a balloon or tube expands resulting in the production of a hollow article. None of these patents, however, relate to the formation of composite baths or whirlpools, but rather describe the formation of a cavity for the purpose of creating a hollow object, such as a tank.

German Patent DT 2951091 teaches the formation of a plastic bathtub which has parallel tubes extending the length of a flange, which tubes may be filled with foam or other materials. The purpose of the tubes is to add rigidity to the tub and reinforce the structure, taking the place of heavy steel rods which were formerly used to reinforce the tub.

The tubes are only useful in areas having a large cross-section, and may be difficult to insert during the molding process.

Commonly assigned U.S. Pat. No. 4,664,982 to Genovese et al. and patent application Ser. No. 07/400,280 to Kuszaj et al., both of which are incorporated by reference herein, describe polymeric foam backed enameled-carbon steel or stainless steel plumbing fixtures that are resistant to chipping, cracking, delamination or deformation when subjected to impact from either the finish or non-finish side. The use of the aforementioned composite molded structures results in fixtures which have the feel of porcelain-cast iron and enamel fixtures, high impact strength, and resistance to delamination. These composite structures possess excellent physical and mechanical properties as a result of the chemical bonding of the reinforced foam polymeric layer to the enameled steel or stainless steel shell. A problem with such fixtures, however, is that a large amount of polymeric material is used in certain portions of the tubs, resulting in increased weight and increased costs. In addition, in the portions having increased cross-sectional areas of polymeric material, the fixtures may suffer problems due to distortion, bow and warpage from the shrinkage of the polymeric material as it cures. They also may be subject to distortion, bow and warpage in these thicker portions due to the inability of the polymeric material to release heat and gas produced during the curing process Another approach was to replace the enamelled-steel shell with a polymeric-cosmetic surface layer and binding that layer directly to a foamed plastic substrate to provide a high impact strength, delamination-resistant structure. This approach is disclosed in commonly assigned U.S. Pat. Nos. 4,844,944 and 4,844,955, both to Graefe et al., the disclosures of which are incorporated by reference herein. These approaches suffer from the same problems described above with regard to U.S. Pat. No. 4,664,982 and application Ser. No. 07/400,280.

A still further approach is described in commonly assigned application Ser. No. 07/499,188 filed Mar. 26, 1990. This application discloses a method wherein a bathtub shell is loaded into a mold receptor such that a void is provided between the shell and mold receptor. A male mold member exerts pressure upon the shell as a hardenable material is introduced under pressure into the void. Once this material has hardened, the now-coated bathtub shell is removed from the mold receptor.

Since there is considerable pressure on the bottom of the bathtub shell as the hardenable material enters the void, it may tend to deflect even though the male mold member bears against the top surface of the shell. This is due to the fact that all shells ar not precisely alike, and voids are created between the male mold member and the shell where deformation may occur.

SUMMARY OF INVENTION

It is an object of the invention to provide a molding process for providing a coating to a bathtub shell or the like without deflecting the walls of the shell.

It is another object of the invention to provide such a molding process which allows a male mold member to bear against a surface of a shell without damaging the same.

In accordance with these and other objects of the invention, a method is provided which includes the steps of providing a mold receptor, providing a thin, resilient and substantially flat insert upon the inner surface of a shell, mounting the shell within a mold receptor such that a void is defined between the outer surface of the shell and the mold receptor, causing a male mold member to engage the insert, and introducing a hardenable material into the void, thereby coating the outer surface of the shell. Since the hardenable material is ordinarily introduced under pressure, the male mold member and insert prevent the bottom wall of the shell from deflecting.

The insert is preferably custom fit to the shell and male mold member. This is accomplished by prefabricating the insert in a process involving a master shell and the male mold member. A liquid which is solidifiable into a resilient, compressible solid is poured into the reservoir defined by the master shell. The male mold member is inserted into the reservoir, displacing some of the liquid. The voids which would have existed between the male mold member and shell are accordingly filled by the insert.

DETAILED DESCRIPTION OF THE PREFERRED EMBODIMENTS

A method of manufacturing a coated shell is provided. The coated shell may be employed as a bathtub, whirlpool or other type of reservoir.

Figure 1:
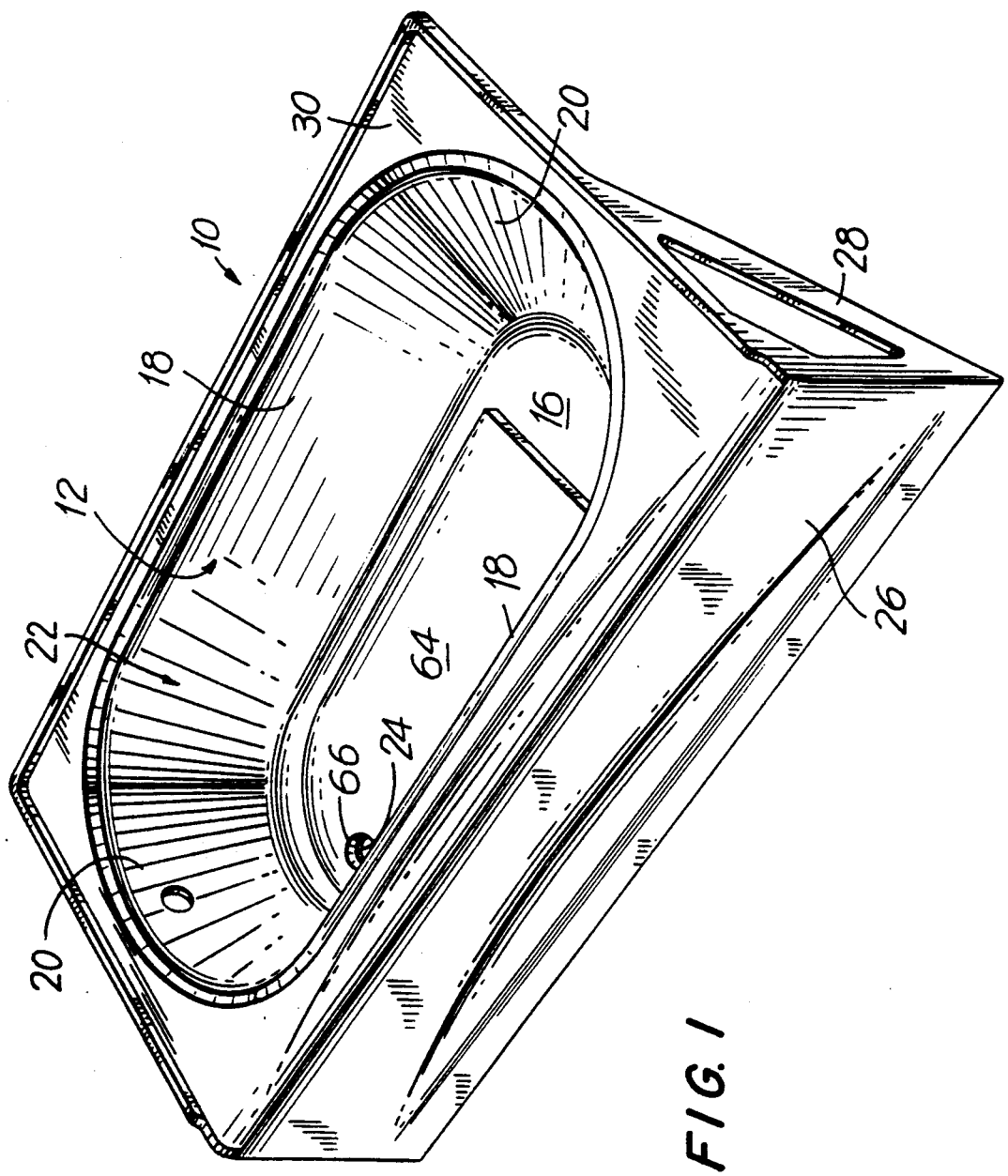
FIG. 1 is a top perspective view of a bathtub shell having a flat, resilient insert positioned upon the bottom wall thereof.

Referring to FIG. 1, a bathtub shell 10 is shown. Such a shell is preferably constructed from steel which has been coated with an enamel on both its finish side 12 and non-finish side 14 (shown in FIG. 3). Such a coating is described in commonly assigned U.S. Pat. No. 4,664,982, the disclosure of which is incorporated by reference herein. In other preferred embodiments of the invention, the shell may be constructed from stainless steel or of a polymeric, fiberglass and/or composite materials as disclosed in commonly assigned U.S. Pat. Nos. 4,844,944 and 4,844,955 to Graefe et al., the disclosures of which are incorporated by reference herein.

The bathtub shell 10 includes a bottom wall 16 and two pairs of opposing side walls 18,20 which adjoin the bottom wall. The bottom and side walls define a reservoir 22 on the finish side of the shell 10. The wall areas where the side and bottom walls adjoin are rounded at least on the finish side 12 of the shell. A drain hole 24 extends through the bottom wall of the shell.

The shell 10 includes an apron 26 which is supported by braces 28 on both the front and rear ends thereof. An integral deck 30 extends about the reservoir 22 and adjoins the apron 26.

Figure 2:
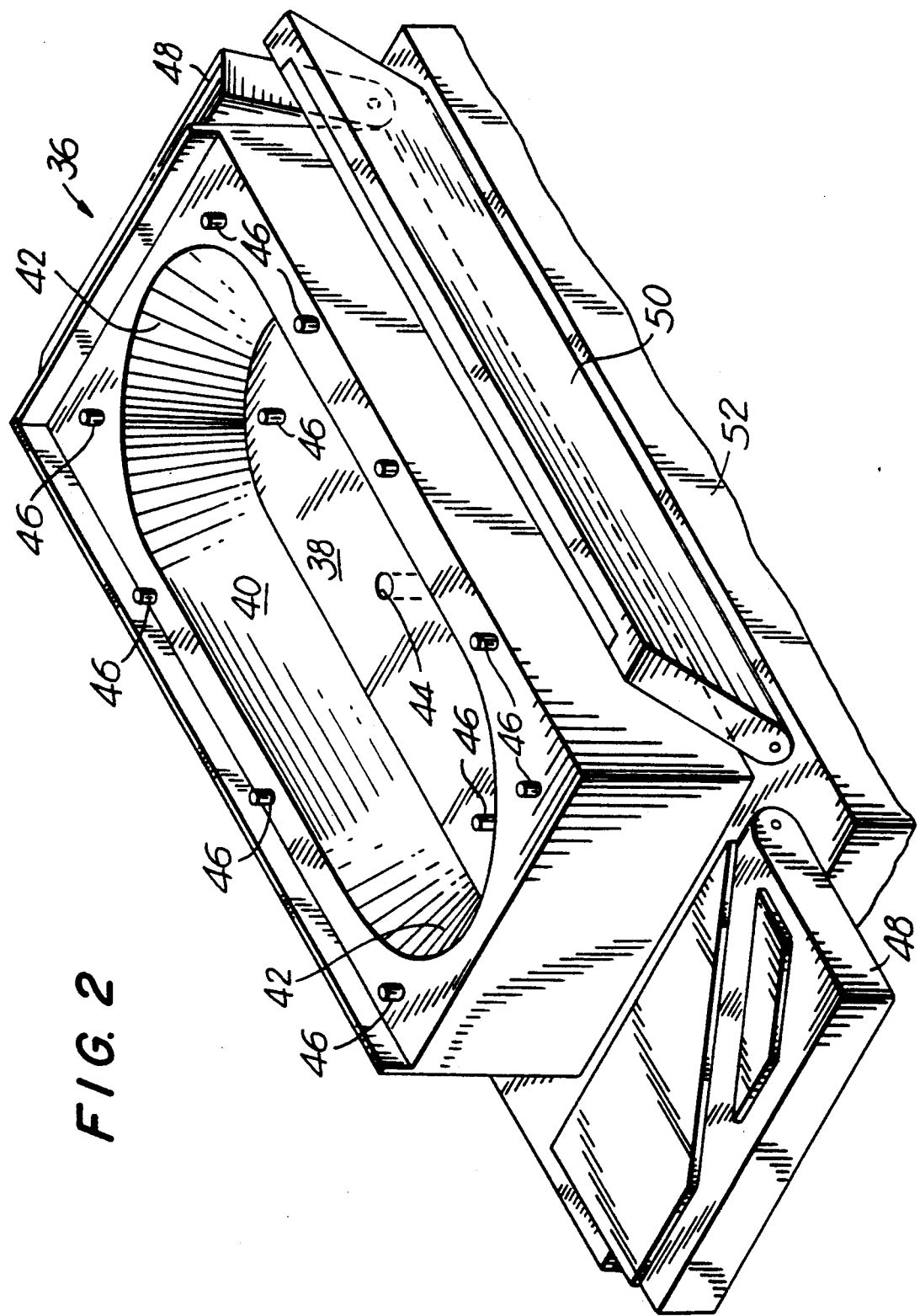
FIG. 2 is a top perspective view of a mold receptor capable of receiving the bathtub shell.
Figure 4:
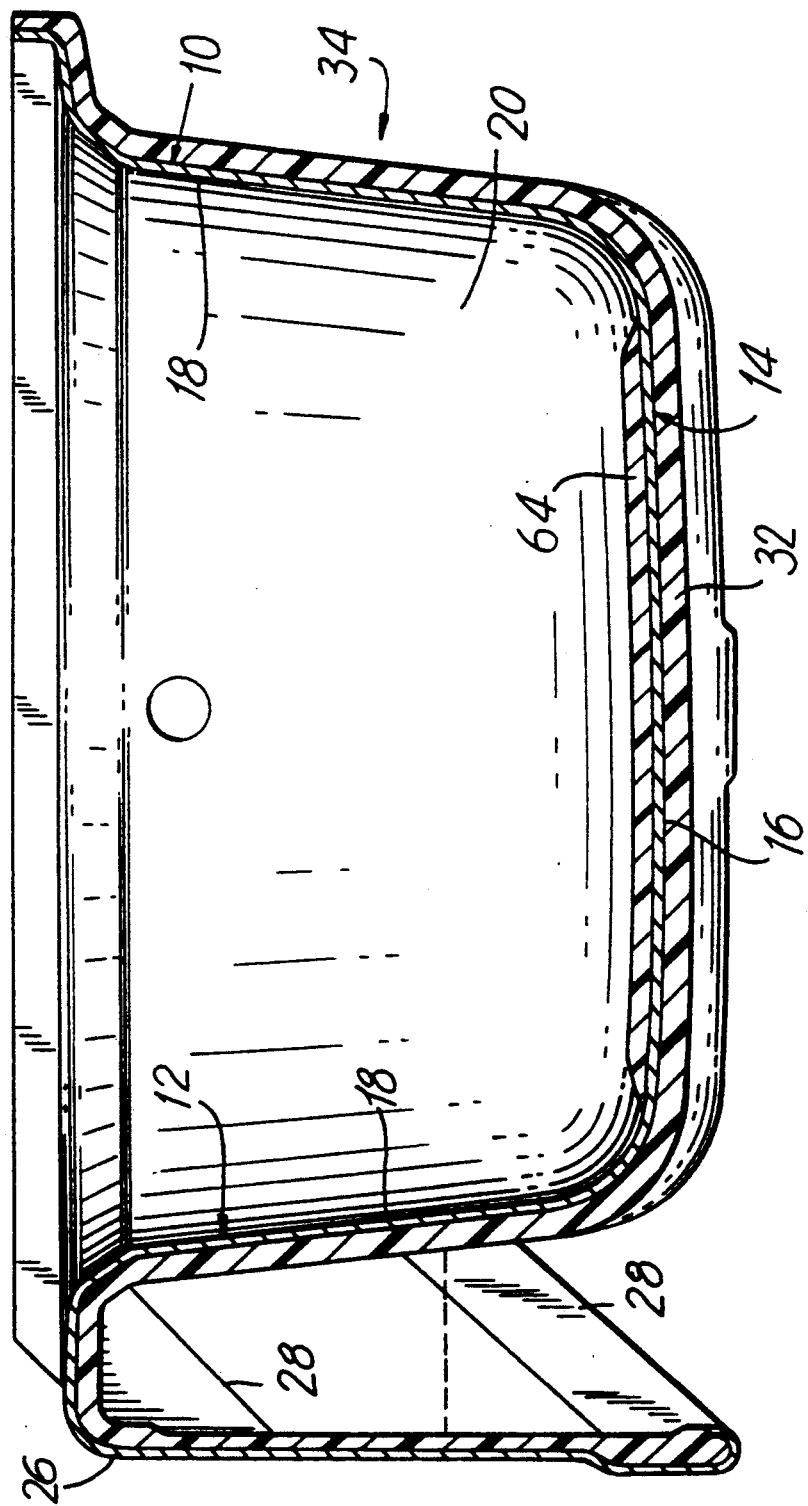
FIG. 4 is a sectional view of a coated bathtub shell.

A polymeric coating 32 is applied to the non-finish side 14 of the shell in the process of completing a bathtub 34 as shown in FIG. 4. The above-referenced U.S. Pat. Nos. 4,844,944 and 4,844,955 disclose a polymeric foam and primer which may be employed in the coating process. Such a foam and primer, or any other suitable hardenable material, are applied to the shell once it has been positioned in a molding apparatus Referring to FIG. 2, a mold receptor 36 is provided for receiving the shell and controlling the flow of the hardenable material to be introduced into the voids existing between it and the shell. The mold receptor includes a bottom wall 38 and two pairs of opposing side walls 40,42 which define a reservoir. An opening 44 extends through the bottom wall 38 of the mold receptor 36, and is used for introducing the hardenable coating material to the reservoir. A plurality of ejectors 46 are provided for ejecting a coated shell once the coating has hardened. The ejectors ar preferably in the form of hydraulically actuated cylindrical rods which may be moved from a recessed position to the protruding positions shown in FIG. 2. They extend through the bottom wall 38 of the mold receptor and the deck surrounding the reservoir thereof.

A pair of side doors 48 and an apron door 50 are pivotably secured to a base 52 which supports the reservoir portion of the mold receptor. The side doors 48 are each configured to receive the braces 28 of the shell 10. Both the side doors 48 and the apron door 50 are covered with an elastomeric material to sealingly engage and hold the braces and apron of the shell 10 during the molding process to be described hereafter.

Figure 3:
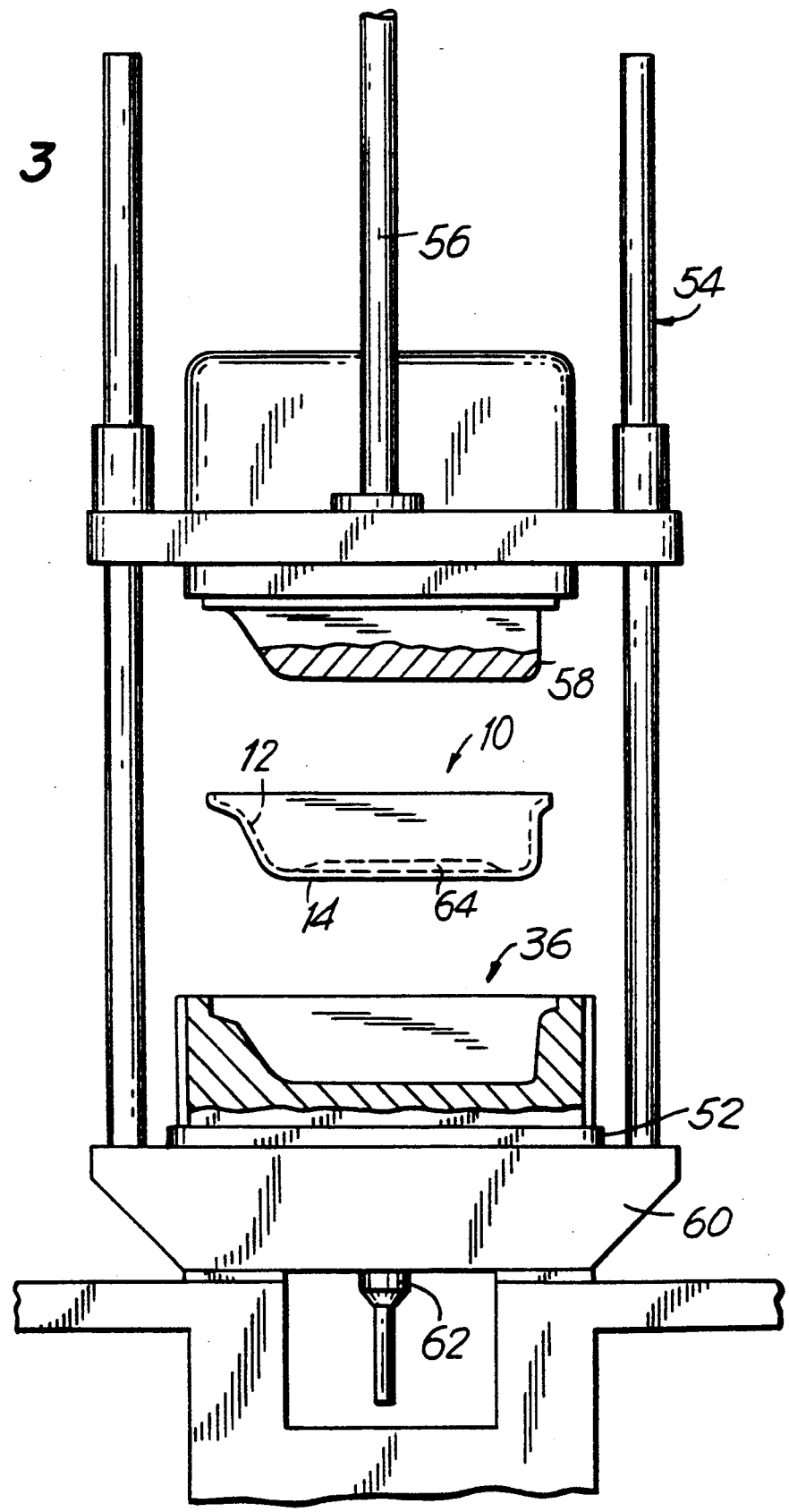
FIG. 3 is a partially sectional elevation view which schematically illustrates a molding apparatus.

Referring now to FIG. 3, the bathtub shell 10 and mold receptor 36 are shown in conjunction with a molding press 54. The press includes a hydraulically operated mechanism 56 for raising and lowering a male member 58. It further includes a platform 60 for supporting the mold receptor 36. Presses of this type are commercially available.

The male mold member 58 secured to the press 54 has a rubbery elastomeric surface which is constructed to fit as snugly as possible into the reservoir defined by the bathtub shell 10. It seals the shell 10 with respect to the mold receptor to form a closed cavity between the upper faces of the mold receptor 36 and the non-finish side of the shell 10. A mix head 62 is positioned beneath the platform 60 for injecting a hardenable material into this cavity.

While the male mold member 58 is designed to minimize warp, distortion and bowing of the bathtub shell 10 during the injection molding process, it may not conform exactly to the shape of each shell which is mounted to the press. A substantially flat, resilient insert 64 as shown in FIGS. 1,3 and 4 is accordingly positioned upon the bottom wall 16 of the shell 10. The thickness of the insert is exaggerated in the figures for illustrative purposes.

The insert 64 is made from a solidifiable material such as polyurethane which is soft and resilient when it solidifies. The insert is preferably constructed by pouring the solidifiable material into the reservoir of a master shell which serves as the master for the bathtub shells to be coated in the manner described herein. The male mold member 58 is lowered into the reservoir, thereby displacing the still liquid solidifiable material. Once this material has solidified, the male mold member is retracted. The flash is trimmed so that the peripheral edges of the insert adjoin the rounded portions of the shell where the side walls 18,20 thereof adjoin the bottom wall 16. These peripheral edges have a tapered or feathered configuration. A hole 66 is punched through the insert. This hole 66 is positioned over the drain hole 24 when the insert is placed upon the bottom wall of the shell.

The maximum thickness of the insert is about ninety thousandths of an inch or less. In accordance with a preferred embodiment of the invention, the maximum thickness is about one thirty-second of an inch. The insert is compressed about ten thousandths of an inch during the injection molding process described below.

The polymeric coating 32 is applied to the shell 10 once the shell has been positioned upon the mold receptor 36. The insert 64 is positioned upon the bottom wall of the shell and the male mold member 58 is moved into engagement with the insert, slightly compressing it. The doors 48,50 of the mold receptor are also closed at this time.

The mix head 62 causes the hardenable material or combination of materials to be injected through the opening 44 in the mold receptor 36 and into the void between the non-finish side 14 of the shell and the upper face of the mold receptor. A urethane plug (not shown) positioned in the drain hole 24 of the shell prevents the material from entering the reservoir 22. The hole 66 in the insert insures that this plug will not be displaced upon engagement of the male mold member with the insert.

Since there are no spaces between the bottom wall 16 of the shell and the male mold member 58, distortion of the bottom wall due to the pressure exerted by the hardenable and, preferably, foamable material, is prevented. Once the material has hardened into a solid coating 32, the male mold member 58 is retracted and the ejectors 46 actuated to remove the shell 10 from the mold receptor 36. The insert 64 is then removed from the finished product shown in FIG. 4.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method for coating a shell which includes an outer surface and an inner surface, said inner surface defining a reservoir, comprising:
   providing a mold receptor;
   providing a thin, resilient and substantially flat insert upon the inner surface of said shell, providing a master shell defining a reservoir having substantially the same dimensions as said shell, pouring a solidifiable material into the reservoir of the master shell, inserting a male mold member into said reservoir of the master shell, thereby displacing the solidifiable material, and allowing the solidifiable material to solidify;
   mounting said shell within said mold receptor such that a void is defined between the outer surface of said shell and said molding receptor;
   causing said male mold member to engage said insert; and
   introducing a hardenable material into said void, thereby coating the outer surface of said shell.

2. A method as described in claim 1 wherein said male mold member has a resilient surface, including the step of inserting said male mold member into said shell such that said male mold member fits snugly within said shell.

3. The method as described in claim 1 wherein said male member fits snugly within said shell.

4. A method as described in claim 1 wherein said male mold member slightly compresses said insert.

5. A method as described in claim 4 wherein said hardenable material exerts pressure upon said shell.

6. A method as described in claim 5 wherein said shell includes a bottom wall and peripheral side walls extending upwardly form said bottom wall, said insert extending over at least part of said bottom wall.

7. A method as described in claim 6 wherein said shell is a bathtub shell.

8. A method as described in claim 7 wherein said bathtub shell includes a drain hole extending through said bottom wall, said insert including an opening therethrough aligned with said drain hole.

9. A method as described in claim 7 wherein said insert is greater in thickness near the center thereof than at the edges thereof.

10. A method as described in claim 9 wherein said insert includes a feathered peripheral edge.

11. A method as described in claim 1 wherein said shell is a bathtub shell.

12. A method as described in claim 7 wherein said insert has a maximum thickness of ninety thousandths of an inch or less.

13. A method as described in claim 4 wherein said male mold member compresses said insert about ten thousandths of an inch.

14. A method as described in claim 6 wherein the inner surface of said shell is rounded where said side walls adjoin said bottom wall thereof, said insert including peripheral edges which adjoin the rounded inner surface portions of said shell.

15. A method as described in claim 14 wherein said peripheral edges of said insert are feathered where they adjoin the rounded inner surface portions of said shell.

16. A method as described in claim 4 wherein said shell is a bathtub shell having an enamel coating.

17. A method as described in claim 16 wherein said male mold member substantially corresponds to the shape of said reservoir.

18. A method as described in claim 1 wherein said male mold member substantially corresponds to the shape of said reservoir.

19. A method as described in claim 6 wherein said male mold member substantially corresponds to the shape of said reservoir.

20. A method as described in claim 7 wherein said mold receptor includes a reservoir, including the step of positioning said shell at least partially within the reservoir of said mold receptor.

* * * * *